C. A. HARDY.
TIRE.
APPLICATION FILED AUG. 26, 1905.
1,130,273.
Patented Mar. 2, 1915.
2 SHEETS—SHEET 1.
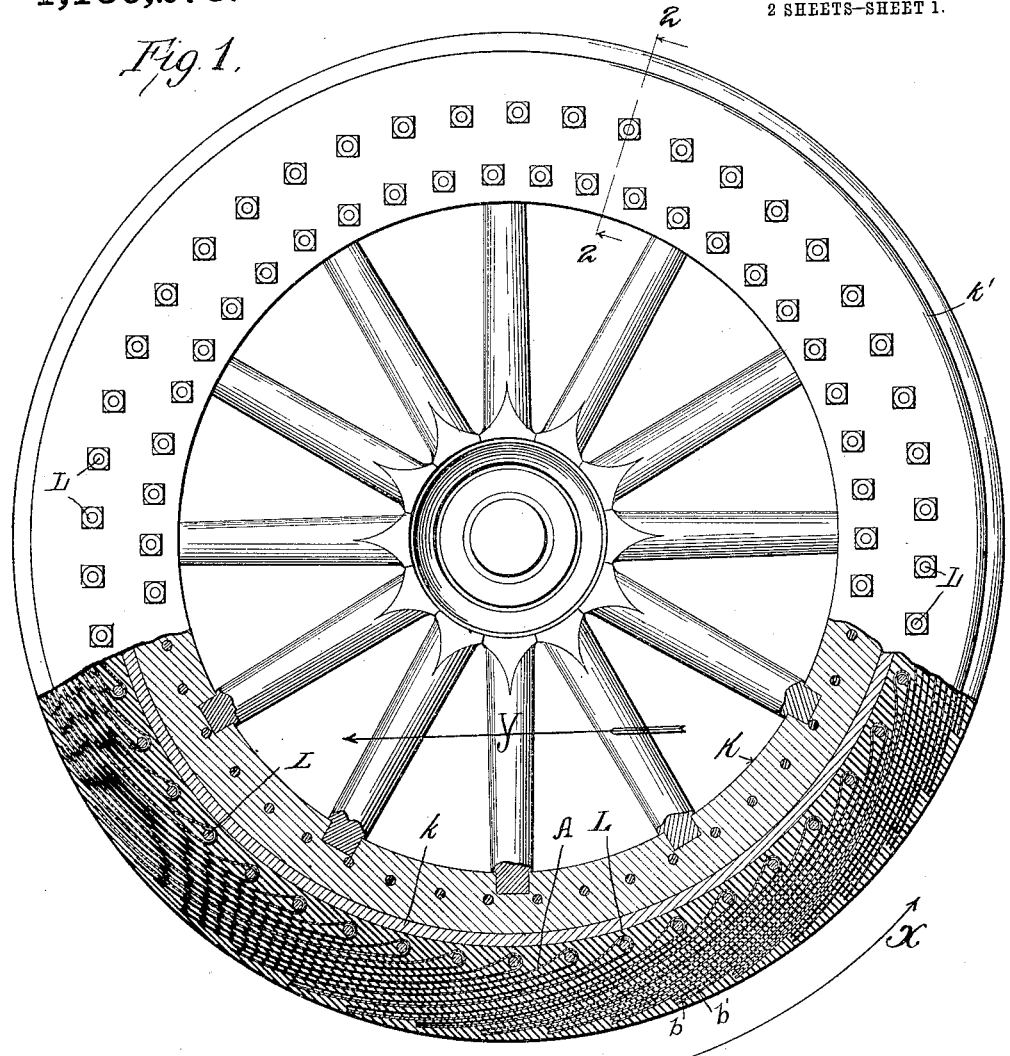
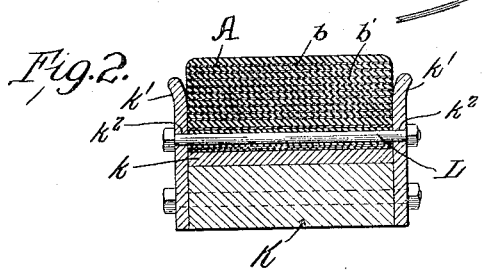
Witnesses:
Inventor:
Clement A. Hardy,
by A. H. Bliss atty

UNITED STATES PATENT OFFICE.

CLEMENT A. HARDY, OF CHICAGO, ILLINOIS.

TIRE.

1,130,273.  Specification of Letters Patent.  Patented Mar. 2, 1915.

Application filed August 26, 1905. Serial No. 275,928.

*To all whom it may concern:*

Be it known that I, CLEMENT A. HARDY, a citizen of the United States, residing at Chicago, in the county of Cook and State of Illinois, have invented certain new and useful Improvements in Tires, of which the following is a specification, reference being had therein to the accompanying drawing.

This invention relates to improvements in vehicle tires which are formed of rubber and fabric, its object being to prevent the rubber component from being rapidly abraded, torn and destroyed when power is applied to the wheel, and to provide a tire having a tensile strength much greater than that incident to rubber tires as heretofore made.

Figure 3:
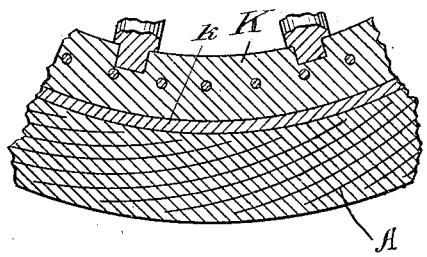
Figure 4:
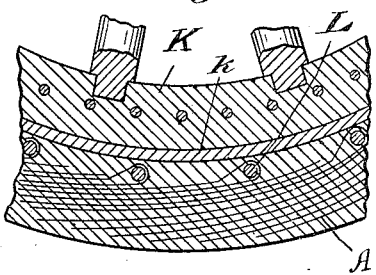
Figure 5:
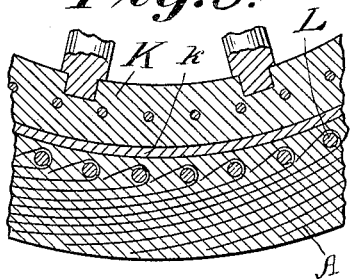

Figure 1 is a side view of a wheel (with part of the rim broken away) having one of my improved tires attached. Fig. 2 is a cross section of the tire and rim taken along the line 2—2 of Fig. 1. Figs. 3, 4 and 5 are fragmentary sectional views of modified constructions showing different arrangements of tire units or sections.

The tire is composed of strips of flexible material, together with rubber, the strips lying on long curves and being doubled around retaining pins in the rim of the wheel. The curves on which the strips normally lie, are approximately concentric with the axis of the wheel, or are on elongated curves which are tangential to circles struck from the axis. Each strip lies so that its wide surfaces are at all radial sections parallel to the axis. These strips are indicated by A, and each is preferably composed of a strip of woven fabric of suitable character, such as canvas. The width is approximately equal to the width of the tire. The strips, as above noted, lie in elongated curves, having their concave sides toward the wheel axis. Each is formed with an upper ply $b$ and a lower ply $b'$, which, at the places of bending at the inner side of the tire, provide an eye or aperture for the reception of a transverse pin or bolt to be described. Between each ply of the canvas strips and the next there is a thin body or layer of rubber and this rubber extends integrally at the ends of the several plies and fills the end spaces to make a solid mass.

The tire is a practically solid body composed of rubber and the curved fabric sections, it being made thus solid by any suitable vulcanizing action which will result in unifying and solidifying the various sections. The woven sheets, though extending through the solid body, are substantially integral therewith.

The wheel rim within which the tire is fitted is indicated by K, it consisting of the tread part $k$, and the flange parts $k'$. The latter have apertures $k^2$ for bolts or pins L, there being one of these to correspond for each of the apertures at the bends of the doubled sections above described.

Each strip of the fabric extends from its fastening bolt L in a direction which is forward in relation to lines of advance of the wheel when it is rolling bodily with its bottom points in contact with the ground. Consequently, the propelling strains applied to the wheel and transmitted by them to the tire, are taken up by these tangential or curved strips of fabric which are embedded integrally in the solid rubber mass, and the wearing life of the rubber is greatly prolonged.

In vehicles of the automobile class which effect their forward propulsion by power applied to the ground wheels, there is a constant and powerful pull felt by the yielding tires, and the strain on the tire increases rapidly with the increase of the load. If the wheel revolves in the direction of the arrow X, and the vehicle is traveling in the direction of the arrow Y, the friction of the tire on the ground and the twisting motion of the wheel around its axle continually tend to twist the fabric sections tighter around the wheel and bring the longitudinal strains (which are exerted on the tire between the point of ground contact and the opposite point at the inner edge of the rubber) upon the fabric layers and not upon the rubber directly. I herein refer to the circumferential axis of the tire, meaning the central or median line of the tire body extending longitudinally therethrough and around the wheel axis. I have found that the tensile strength of a rubber tire when constructed in this manner is greatly increased.

I have for the purpose of specific description above referred to the reinforcing or strain-receiving element of the tire as being made of woven fabric, and shall refer to such fabric in the claims below presented. But it will be understood that I do not limit myself to any specific article as alone included within such description or within the scope of the invention. It will be understood that in many respects there can be variations without departing from the essential features of the invention.

In Figs. 3, 4 and 5 I have illustrated some of the modifications coming within the scope of my invention. Fig. 3 shows the canvas strips A as simply embedded in the rubber mass but not connected with transverse pins. Fig. 4 shows the strips looped over the transverse pins L as in the construction shown in Figs. 1 and 2 and also shows other intermediate strips not looped over the pins. Fig. 5 shows strips looped over the pins, but each cut short at one end without being doubled back upon itself throughout the entire length.

I do not herein claim any matters incident to a method followed in manufacturing the tires herein set forth, having presented claims for a method in another application filed by me January 29, 1915, Serial No. 5071.

What I claim is:

1. A solid tire for vehicle wheels comprising an integrally united series of alternate layers of woven fabric and rubber extending along curved lines from the inner part of the tire across its circumferential axis to the outer part, substantially as set forth.

2. A solid tire for vehicle wheels comprising an integrally united series of alternate layers of woven fabric and rubber extending along curved lines from the inner part of the tire across its circumferential axis to the outer part, some of the layers of fabric having loops at their inner ends, substantially as set forth.

3. A solid tire for vehicle wheels comprising an integrally united series of alternate layers of woven fabric and rubber extending along curved lines from the inner part of the tire across its circumferential axis to the outer part, the fabric layers being arranged in pairs with the layers of each pair united at their inner ends, substantially as set forth.

4. A solid tire for vehicle wheels comprising an integrally united series of looped strips of rubber covered fabric, said strips having their looped ends innermost and extending along curved lines from the inner part of the tire and across its circumferential axis to the outer part, substantially as set forth.

5. A solid tire for wheels comprising an integrally united series of alternate layers of woven fabric and rubber extending from the inner part of the tire across its circumferential axis to the outer part, such layers of rubber being comparatively thin in proportion to their length whereby the layers of fabric and rubber extensively overlie each other circumferentially.

6. A solid tire for wheels comprising an integrally united series of alternate layers of woven fabric and rubber extending from the inner part of the tire across its circumferential axis to the outer part, some of the fabric layers having loops at their inner ends adapted to receive tire securing devices and the rubber layers being comparatively thin in proportion to their length whereby the layers of fabric and rubber overlie each other circumferentially.

7. A solid tire for wheels comprising an integrally united series of alternate layers of woven fabric and rubber extending from the inner part of the tire across its circumferential axis to the outer part, the fabric layers being arranged in pairs with the layers of each pair united at their inner ends and the rubber layers being comparatively thin in proportion to their length whereby the layers of fabric and rubber overlie each other circumferentially.

In testimony whereof I affix my signature, in presence of two witnesses.

CLEMENT A. HARDY.

Witnesses:
IRA D. PERRY,
J. B. WEIR.

Copies of this patent may be obtained for five cents each, by addressing the "Commissioner of Patents, Washington, D. C."